(12) United States Patent
Hall III

(10) Patent No.: US 6,766,705 B1
(45) Date of Patent: Jul. 27, 2004

(54) SEVEN-SPEED POWER TRANSMISSION

(75) Inventor: Arthur Hall III, Cicero, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/350,440

(22) Filed: Jan. 24, 2003

(51) Int. Cl.$^7$ .............................................. F16U 3/08
(52) U.S. Cl. ........................................ 74/331; 74/339
(58) Field of Search .................................. 74/331, 339

(56) References Cited

U.S. PATENT DOCUMENTS 6,427,550 B1 * 8/2002 Bowen ................... 74/336 R
6,460,425 B1 * 10/2002 Bowen ....................... 74/331

* cited by examiner

Primary Examiner—Dirk Wright
(74) Attorney, Agent, or Firm—Leslie C. Hodges

(57) ABSTRACT

A power transmission includes a pair of input clutches, a plurality of ratio gear mechanisms, and an output shaft. The ratio gear mechanisms are selectively connected with respective countershafts to complete power flows between the transmission input and transmission output and one or the other of the input clutches. During a ratio upshift, a brake mechanism is connected with each of the input clutches to control the speed of the shafts connected therewith when the clutches are disengaged and an upshift condition is being preselected.

5 Claims, 1 Drawing Sheet

| GEAR | | Pre | 18 | 20 | 62A | 66A | 64B | 66B | 62B | 40 | 38 | 64A | 76 | 74 | Ratio | Ratio Step |
|---|---|---|---|---|---|---|---|---|---|---|---|---|---|---|---|---|
| 1 | | UP | X | | X | O | | | | | | | | | 5.826 | |
| 2 | DOWN | | | X | O | X | | | | | | | | | 3.276 | 1.778 |
| | UP | | | X | | X | O | | | | | | O | | | |
| 3 | DOWN | | X | | | O | X | | | | | | | | 2.366 | 1.385 |
| | UP | | X | | | X | O | | | | | | O | | | |
| 4 | DOWN | | | X | | O | X | | | | | | | | 1.779 | 1.330 |
| | UP | | | X | | | X | O | | | | | O | | | |
| 5 | DOWN | | X | | | | O | X | | | | | | | 1.320 | 1.348 |
| | UP | | X | | | | X | O | | | | | O | | | |
| 6 | DOWN | | | X | | | | O | X | | | | | | 1.000 | 1.320 |
| | UP | | | X | | | | X | O | | O | | | | | |
| 7 | | DOWN | X | | | | | | O | X | | | | | 0.815 | 1.226 |
| R | | | X | | | | | | | | | X | | | 5.493 | |

X = torque carrying member
O = preselected member

SEVEN-SPEED POWER TRANSMISSION

TECHNICAL FIELD

This invention relates to power transmissions and, more particularly, to dual countershaft transmissions.

BACKGROUND OF THE INVENTION

Dual countershaft transmissions, or as they are often termed automatic manual transmissions (AMT), employ mechanical synchronizer clutches whereat full power shifts are available during upshifting of the transmission. The synchronizer clutches, as is well known, establish a synchronous speed between the gear being engaged and the countershaft with which it is rotatably driven. The synchronizer clutches are more costly than a mechanical type jaw clutch or dog clutch, which can be employed in current power transmissions if power interruption during upshifts is permitted. However, since most AMTs desire full power upshifts, the synchronizer clutches are employed in a vast majority of these types of transmissions.

Some single countershaft AMTs permit power interrupted downshifts since during a downshift engine acceleration is expected and desired. These transmissions use jaw-type or dog-type clutches and are not capable of full power upshifts or downshifts.

SUMMARY OF THE INVENTION

It is an object of the present invention to provide an improved power shifting dual input transmission having uninterrupted power upshifts.

In one aspect of the present invention, the transmission provides two selectively engageable input clutches, a plurality of mechanical clutches, and a plurality of meshing ratio gears controlled by the mechanical clutches.

In another aspect of the present invention, the even number transmission ratio paths are controlled by one input shaft and one selectively engageable input clutch and the odd number ratio paths are controlled by another selectively engageable input clutch and another input shaft.

In yet another aspect of the present invention, each of the input shafts has operatively connected therewith a selectively engageable brake mechanism.

In yet still another aspect of the present invention, the selectively engageable brake mechanisms are operative to control the speed of the respective input shaft prior to a power upshift interchange

DESCRIPTION OF AN EXEMPLARY EMBODIMENT

Figures 1, 2:
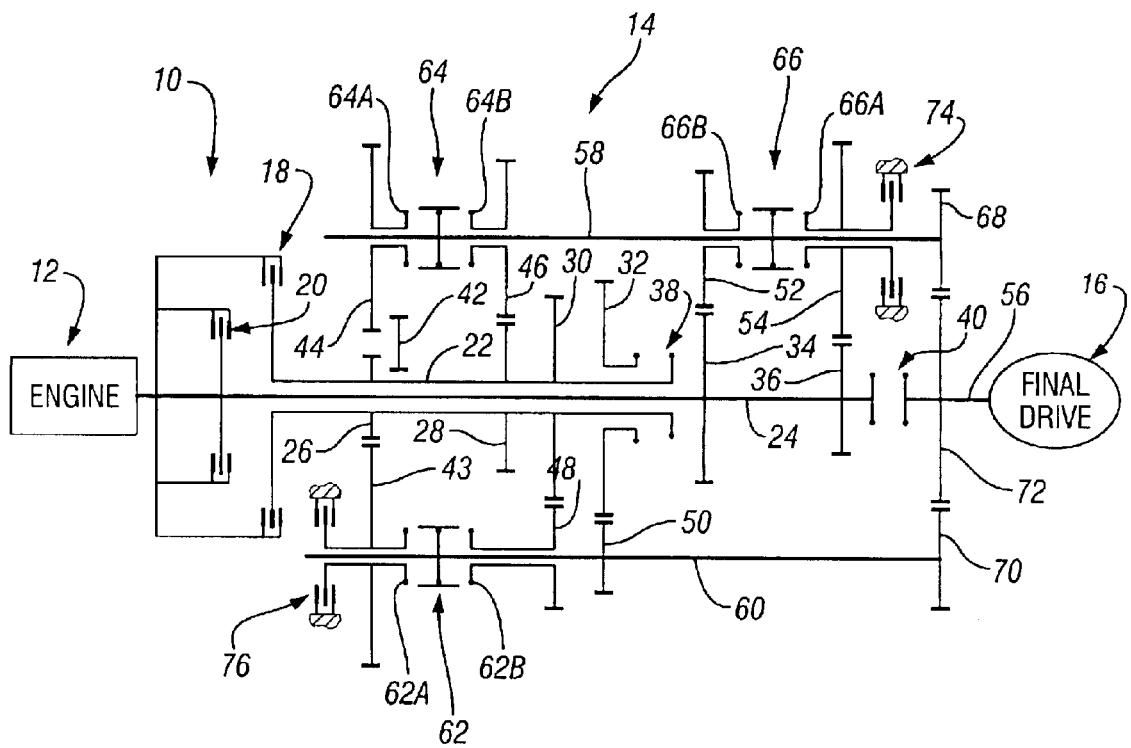
FIG. 1 is a schematic representation of a powertrain having a transmission incorporating the present invention.
FIG. 2 is a chart describing the hydraulic and mechanical torque transmitting mechanism selective engagements during upshifting and downshifting of the transmission shown in FIG. 1.

Referring to the drawings, there is seen in FIG. 1 a powertrain 10 having an engine 12, a power transmission 14, and a conventional final drive mechanism 16. The transmission 14 includes a pair of input clutches 18 and 20 each of which is drivingly connected to a respective shaft 22 and 24. The shaft 22 has rotatably secured therewith a plurality of ratio gears 26, 28, and 30, and a ratio gear 32 rotatably mounted thereon. The shaft 24 has rotatably secured therewith a pair of ratio gears 34 and 36. The shaft 22 has mounted thereon a mechanical clutch 38 and the shaft 24 has mounted thereon a mechanical clutch 40.

The gear 26 meshes with a ratio gear 43. An idler gear 42 is controlled to be placed in engagement with both the gear 26 and a reverse gear 44. The gear 28 meshes with a ratio gear 46, the gear 30 meshes with a ratio gear 48, and the gear 32 meshes with a ratio gear 50. The gear 34 meshes with a ratio gear 52 and the gear 36 meshes with a ratio gear 54.

The mechanical clutch 38 selectively connects the gear 32 with the shaft 22. The mechanical clutch 40 selectively connects the shaft 24 with a transmission output shaft 56. The ratio gears 44, 46, 52, 54 are rotatably mounted on a countershaft 58. The ratio gears 43, 48 are rotatably supported on a countershaft 60 and the ratio gear 50 is rotatably connected with the countershaft 60. A mechanical clutch 62 is manipulable to connect gear 43 with shaft 60 in position 62A and to connect gear 48 with shaft 60 in position 62B.

The shaft 58 has two mechanical clutches 64 and 66 connected thereto. The mechanical clutch 64 is effective in position 64A to connect the gear 44 with the countershaft 58 and in position 64B to connect the gear 46 with the countershaft 58. The mechanical clutch 66 is effective in the position 66A to connect the gear 54 with the countershaft 58 and in position 66B to connect the gear 52 with the countershaft 58. The countershaft 58 has rotatably connected therewith an output gear 68 and the countershaft 60 has rotatably connected therewith an output gear 70. Gears 68 and 70 both mesh with an output gear 72, which is rotatably connected with the output shaft 56.

The gear 54 has operatively connected therewith a selectively engageable brake mechanism or stationary clutch mechanism 74 and the gear 43 has operatively connected therewith a brake mechanism or stationary clutch mechanism 76. The mechanism 74 is effective to selectively control the speed of the shaft 24 through the meshing gears 54 and 36. The mechanism 76 is selectively effective to control the speed of the shaft 22 through the meshing gears 26 and 43. The mechanism 74 is controlled at a level to control the speed of the elements 66A, 66B or 40 until the respective dog clutches can be engaged at a synchronous speed as required by the oncoming ratio. The mechanism 76 is controlled at a level to control the speed of the elements 64A, 64B, 62A, 62B or 38 to establish the desired synchronization for the oncoming ratio.

The clutch 18 is selectively connectable with the shaft 22 such that selective engagement of the clutch 18 will cause rotation of the gear members 26, 28, and 30 and the input side of mechanical clutch 38 whenever the clutch 18 is engaged. The clutch 20 is selectively engageable to connect with the shaft 24. When the clutch 20 is engaged, the gears 34, 36, and part of the mechanical clutch 40 will rotate with the engine 12.

The mechanical clutches 62, 64, 66, 38, and 40 are selectively effective in combination with input clutches 18 and 20 to provide seven forward speed ratios and one reverse speed ratio between the engine 12 and the output shaft 56. These combinations of engagement are shown in the chart of FIG. 2.

To establish the reverse speed ratio, the mechanical clutch 64 is manipulated to the position 64A. After this engagement is completed, the clutch 18 is selectively engaged to complete the power path between the engine 12 and the output shaft 56 through the countershaft 58. This is a reverse drive due to the reverse idler 42, which is disposed between the gear 26 and the gear 44.

To establish the first forward speed ratio, the mechanical clutch 62 is positioned in 62A and to complete the first forward speed ratio the clutch 18 is engaged. The ratio change from reverse-to-forward is a power interrupted ratio interchange. When the transmission is operating in the first forward speed ratio, the mechanical clutch 66 can be preselected to the position 66A. To complete a 1–2 interchange, the clutch 18 is disengaged while the clutch 20 is engaged, thereby changing the power path from the gear mesh 26–43 to the gear mesh 36–54. The mechanical clutch 62 can remain in the position 62A in anticipation of a downshift from second-to-first, if desired as noted in the chart of FIG. 2. Those skilled in the art will appreciate that the clutches 18 and 20 are interchanged without an interruption of power flow to the output shaft 56. This interchange is similar to those performed with planetary transmissions.

When operating in second gear or second forward speed ratio and the mechanical clutch 62 in the neutral position, the mechanical clutch 64 can be positioned in the position 64B. In order to accomplish this without using a more conventional synchronizer, the brake 76 is controlled in engagement to thereby control the speed of shaft 22 and gear 46. When the speed of gear 46 and the countershaft 58 are in synchronous operation, the mechanical clutch 64 is moved to the position 64B. Thus, a preselection is made without interrupting power flow.

To complete the second-to-third interchange, the clutch 20 is disengaged while the clutch 18 is engaged without interruption in power flow. During the upshift from second-to-third, the transmission remains conditioned for a downshift to second since the mechanical clutch 66 is in the position 66A. However, to condition the transmission for an upshift to the fourth forward speed ratio, the mechanical clutch 66 is placed in the neutral position and the brake 74 is selectively controlled to establish the speed of the shaft 24, which also controls the speed of gears 34 and 52.

When the gear 52 reaches synchronous speed with the countershaft 58, the mechanical clutch 66 can be positioned in the position 66B in preparation for the fourth forward speed ratio. The fourth forward speed ratio is completed with the interchange of the clutches 18 and 20. It should be noted in the chart of FIG. 2 that completion of the fourth forward speed ratio leaves the transmission conditioned for a downshift to third if a downshift is immediately desirable.

While operating in the fourth forward speed ratio, the transmission is conditioned for a fourth-to-fifth upshift by placing the mechanical clutch 64 in neutral and controlling the engagement of the brake 76 to thereby control the speed of the shaft 22 and gears 30 and 48. When the gear 48 reaches synchronous speed with the countershaft 60, the mechanical clutch 62 is manipulated to position 62B. The fourth-to-fifth ratio interchange is completed by interchanging the clutches 18 and 20.

When the fifth forward speed ratio is initially engaged, the transmission remains conditioned for a downshift to fourth should an immediate downshift be desired. However, to condition the transmission for an upshift from the fifth ratio to sixth ratio, the mechanical clutch 66 is placed in neutral and the brake mechanism 74 is controlled to cause the speed of shaft 24 to be synchronized with the speed of the output shaft 56 such that the mechanical clutch 40 can be manipulated to interconnect the shafts 24 and 56. An upshift from fifth-to-sixth ratio is completed by interchanging the clutches 18 and 20.

As with other previous upshifts, the upshift to sixth leaves the transmission conditioned for an immediate downshift to fifth if that is desired. However, to condition the transmission for an upshift from sixth-to-seventh ratio, the mechanical clutch 62 is placed in neutral and the brake mechanism 76 is selectively manipulated to control the speed of shaft 22 such that synchronization between the shaft 22 and the gear 32 is effected. To complete the upshift from sixth-to-seventh ratio, the clutches 20 and 18 are interchanged. Following this interchange, the transmission remains conditioned for a seventh to sixth downshift.

As is well known, the clutches 20 and 18 can be interchanged in a full power flow arrangement. In other words, there is no power interruption during the interchange of the clutches 18 and 20.

The downshift sequence for the present transmission does not utilize the preselect methodology normally associated with full preselect transmissions. This is evident in a downshift from fifth ratio to fourth ratio, for example. If the transmission is operating in the fifth ratio, the clutch 18 and the mechanical clutch 62 transmit torque with the mechanical clutch 62 being in the position 62B. Additionally, in anticipation of an upshift, the mechanical clutch 40 has been engaged. However, with the control determining that a downshift is required, the mechanical clutch 40, which is unloaded, is returned to the neutral position. Simultaneously, the clutch 18 is disengaged and the clutch 20 is rapidly engaged. The engine is permitted, to accelerate thereby accelerating the output of clutch 20 and the gears 34 and 36 that are associated therewith. When the gear 34 has accelerated the gear 52 to a speed synchronous with the countershaft 58, the clutch 66 is synchronously engaged to the position 66B, thereby completing the downshift from fifth-to-fourth. Following completion of the shift, the engine is reset to the speed level established by the operator. Each of the other downshifts is similarly accomplished.

What is claimed is:

1. A power transmission for use in a powertrain having an engine comprising:

a first selectively engageable and disengageable input clutch;

a second selectively engageable and disengageable input clutch;

a first shaft selectively connectable with the engine by said first selectively engageable and disengageable input clutch;

a second shaft selectively connectable with the engine by said second selectively engageable and disengageable input clutch;

a first plurality of ratio gears drivingly connected with said first shaft;

a first countershaft;

a second plurality of ratio gears rotatably mounted on said first countershaft and meshing with respective ones of said first plurality of ratio gears;

first mechanical clutch means for selectively interconnecting each of said second plurality of ratio gears to said first countershaft;

a third plurality of ratio gears drivingly connected with said second shaft;

a second countershaft;

a fourth plurality of ratio gears rotatably mounted on said second countershaft;

a second mechanical clutch means for selectively interconnecting each of said fourth plurality of ratio gears with said second countershaft;

a first brake means operatively connected with one of said second plurality of ratio gears for controlling the speed of said first shaft when said first selectively engageable and disengageable clutch is disengaged;

a second brake means operatively connected with one of said fourth plurality of ratio gears for controlling the speed of said second shaft when said second selectively engageable and disengageable clutch is disengage;

said second brake means being operated during preselection of upshifts to ratios through said second countershaft to control the speed of said second countershaft when said first countershaft is transmitting power; and said first brake means being operated during preselection of upshifts to ratios through said first countershaft to control the speed of said first countershaft when said second countershaft is transmitting power;

an output shaft continuously interconnected with said first and second countershafts through output gear means.

2. The power transmission defined in claim 1 further comprising:

said first and second brake means being inoperative during downshift ratio interchanges.

3. The power transmission defined in claim 2 further comprising third mechanical clutch means for directly connecting the engine with a transmission output shaft through one of said input clutches.

4. The power transmission defined in claim 3 further comprising:

first output gear means disposed between said first countershaft and said transmission output shaft; and second output gear means disposed between said second countershaft and said transmission output shaft.

5. The power transmission defined in claim 2 further comprising:

a first gear member rotatably mounted on said second shaft;

a second gear member rotatable with said second countershaft and meshing with said first gear member; and a fourth mechanical clutch means for selectively connecting said first gear member with said second shaft.

* * * * *